United States Patent [19]
Fernandez et al.

[11] Patent Number: 5,596,634
[45] Date of Patent: Jan. 21, 1997

[54] TELECOMMUNICATIONS SYSTEM FOR DYNAMICALLY SELECTING CONVERSATION TOPICS HAVING AN AUTOMATIC CALL-BACK FEATURE

[75] Inventors: Christopher Fernandez, Aurora; Angela R. Just, Downers Grove, both of Ill.; Gregory P. Kochanski, Dunellen, N.J.

[73] Assignee: AT&T, Holmdel, N.J.

[21] Appl. No.: 355,384

[22] Filed: Dec. 13, 1994

[51] Int. Cl.[6] .................................................. H04M 3/42
[52] U.S. Cl. ........................... 379/201; 379/203; 379/142; 379/127; 379/88
[58] Field of Search .................................... 379/67, 68, 69, 379/81, 85, 87, 88, 89, 90, 92, 101, 127, 142, 201, 202, 203, 204, 205, 206, 207, 208, 209, 258, 265, 266, 309, 350, 355; 395/2.79, 2.84

[56] References Cited

U.S. PATENT DOCUMENTS

| | | | |
|---|---|---|---|
| 4,691,347 | 9/1987 | Stanley et al. | 379/203 |
| 4,812,843 | 3/1989 | Champion, III et al. | 340/905 |
| 4,910,766 | 3/1990 | Ogino et al. | 379/201 |
| 4,969,185 | 11/1990 | Dorst et al. | 379/209 |
| 4,979,206 | 12/1990 | Padden et al. | 379/67 |
| 5,086,394 | 2/1992 | Shapira | 364/419 |
| 5,210,611 | 5/1993 | Yee et al. | 358/191.1 |
| 5,369,694 | 11/1994 | Bales et al. | 379/206 |
| 5,408,518 | 4/1995 | Yunoki | 379/67 |
| 5,428,778 | 6/1995 | Brookes | 395/600 |
| 5,457,738 | 10/1995 | Sylvan | 379/201 X |
| 5,483,587 | 1/1996 | Hogan et al. | 379/202 |
| 5,483,588 | 1/1996 | Eaton et al. | 379/202 |
| 5,488,650 | 1/1996 | Greco et al. | 379/67 |

*Primary Examiner*—Krista M. Zele
*Assistant Examiner*—Scott L. Weaver
*Attorney, Agent, or Firm*—Robert B. Levy

[57] ABSTRACT

A telecommunications system for providing an initial caller with access to one of a plurality of conversations each relating to a particular conversation topic available in the system. The system includes a voice recognizer and response unit for communicating with the caller. The caller selects a desired conversation topic by either generating an audio command to the voice recognizer, inputting a command in the keypad of the caller's telephone or computer, or communicating with a human operator. Upon selection of an available topic, the system connects the caller to a current conversation relating to that topic. In the event that there are no current conversations for the selected topic, the call is terminated and the system automatically calls back the initial caller when another caller selects the same topic as the initial caller.

22 Claims, 3 Drawing Sheets

TELECOMMUNICATIONS SYSTEM FOR DYNAMICALLY SELECTING CONVERSATION TOPICS HAVING AN AUTOMATIC CALL-BACK FEATURE

BACKGROUND OF THE INVENTION

1. Field of the Invention

The present invention relates to telecommunications systems, and more particularly to telephone systems providing services for customers to access telephone conversations based upon a desired conversation topic.

2. Description of the Related Art

Telephone systems are currently used to provide a service for permitting a caller to access an on-going telephone conversation by dialing a specific telephone number, such as a 900 toll service. Typically, the specific telephone number relates to a single conversation topic. Accordingly, in these prior art telephone systems, the caller manually dials a specific telephone number corresponding to the conversation topic of interest and, so long as a conversation was on-going, the caller would be connected to and could participate in that particular conversation.

These prior art telephone systems, however, have a number of limitations. For instance, in the prior art systems, the number of available conversation topics are limited due to the fact that each telephone number is typically dedicated to a single or a limited number of conversation topics. The number of available topics are limited because the prior art systems required the topics to be verbally enumerated to the caller and this verbal enumeration is too slow to be practicable for more than typically ten topics.

Thus, in order to introduce additional conversation topics, a provider of these services must absorb the expense of contracting for additional 900 telephone services, which may also include expenses for market research to select the most popular topics and advertising to promote the new topics. Consequently, the prior art systems provide only a limited number of the most popular conversation topics. Less popular topics or topics that are popular for only a short period of time would not typically be offered due to the aforementioned expenses in introducing new topics.

Moreover, once the caller identifies and manually dials the telephone number for the desired conversation topic, the caller is only connected to the call if a conversation is on-going. However, in the not uncommon situation where there is no pending conversation, the call is terminated and the caller must repeatedly dial the number until a conversation is then pending.

SUMMARY OF INVENTION

The present invention expands the utility of the prior art systems by providing customers with access to conversations concerning a significantly broader range of topics by dialing a single access telephone number. The available conversation topics may be dynamically updated based upon the current demand of the calling customers.

The preferred embodiment of the present invention provides an initial caller with access to one of a plurality of conversations each relating to a particular available topic. The system includes a voice recognizer and response unit for communicating with the caller. The caller selects a desired conversation topic by either generating an audio command to the voice recognizer, inputting a command in the keypad of the caller's telephone or computer, or communicating with a human operator. Upon selection of an available topic, the system connects the caller to a current conversation relating to that topic. In the event that there are no current conversations for the selected topic, the call is terminated and the system automatically calls back the initial caller when another caller selects the same topic as the initial caller.

DESCRIPTION OF THE PREFERRED EMBODIMENTS

The principles of the present invention are illustrated in a preferred embodiment described below which provides a caller with access to a number of conversation topics and either connects the caller to the desired conversation or automatically calls back the caller when other callers are interested in discussing the same topic.

Figure 1:
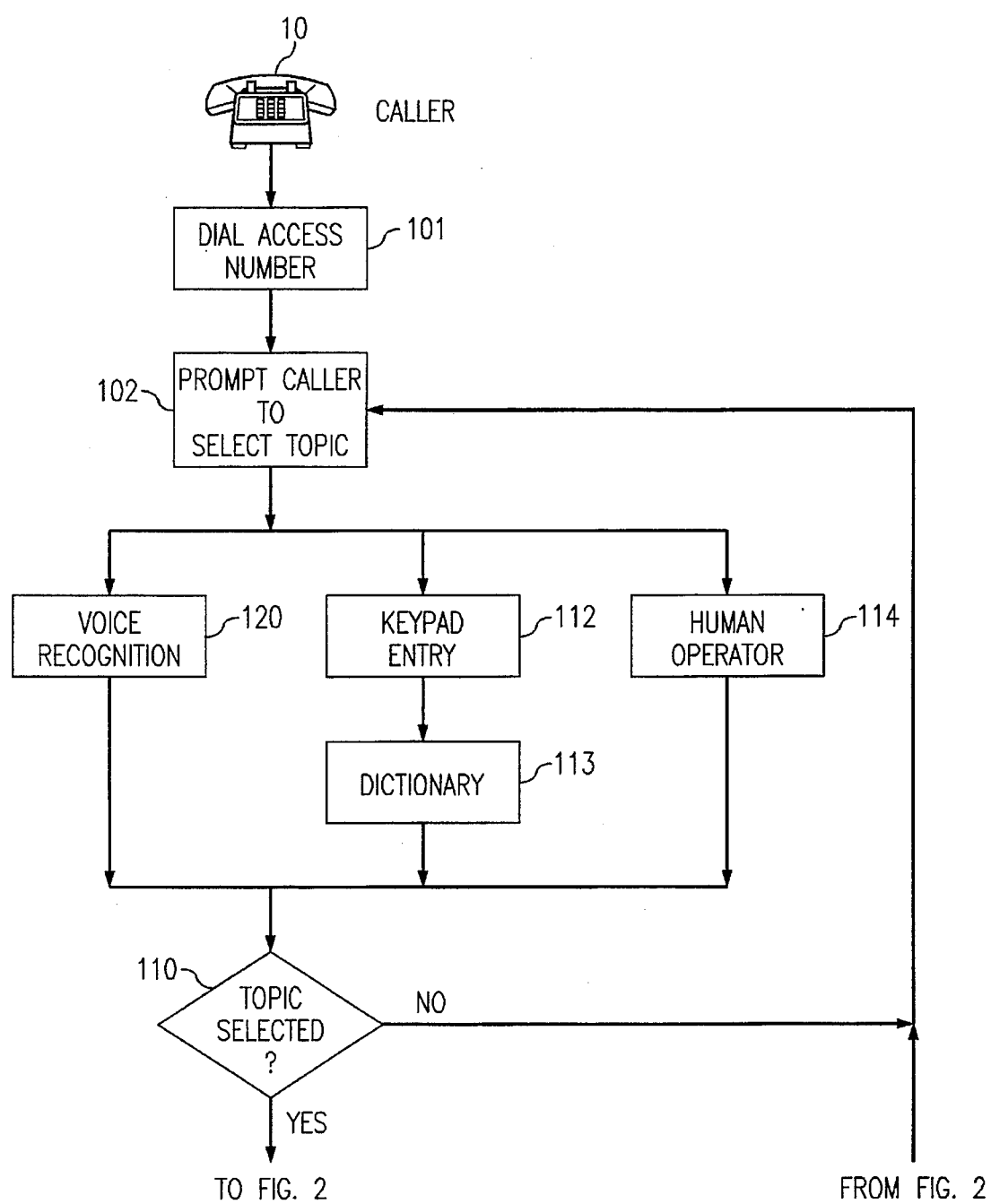
FIGS. 1 and 2 illustrate a method of operating the telecommunications system of the present invention.
Figure 2:
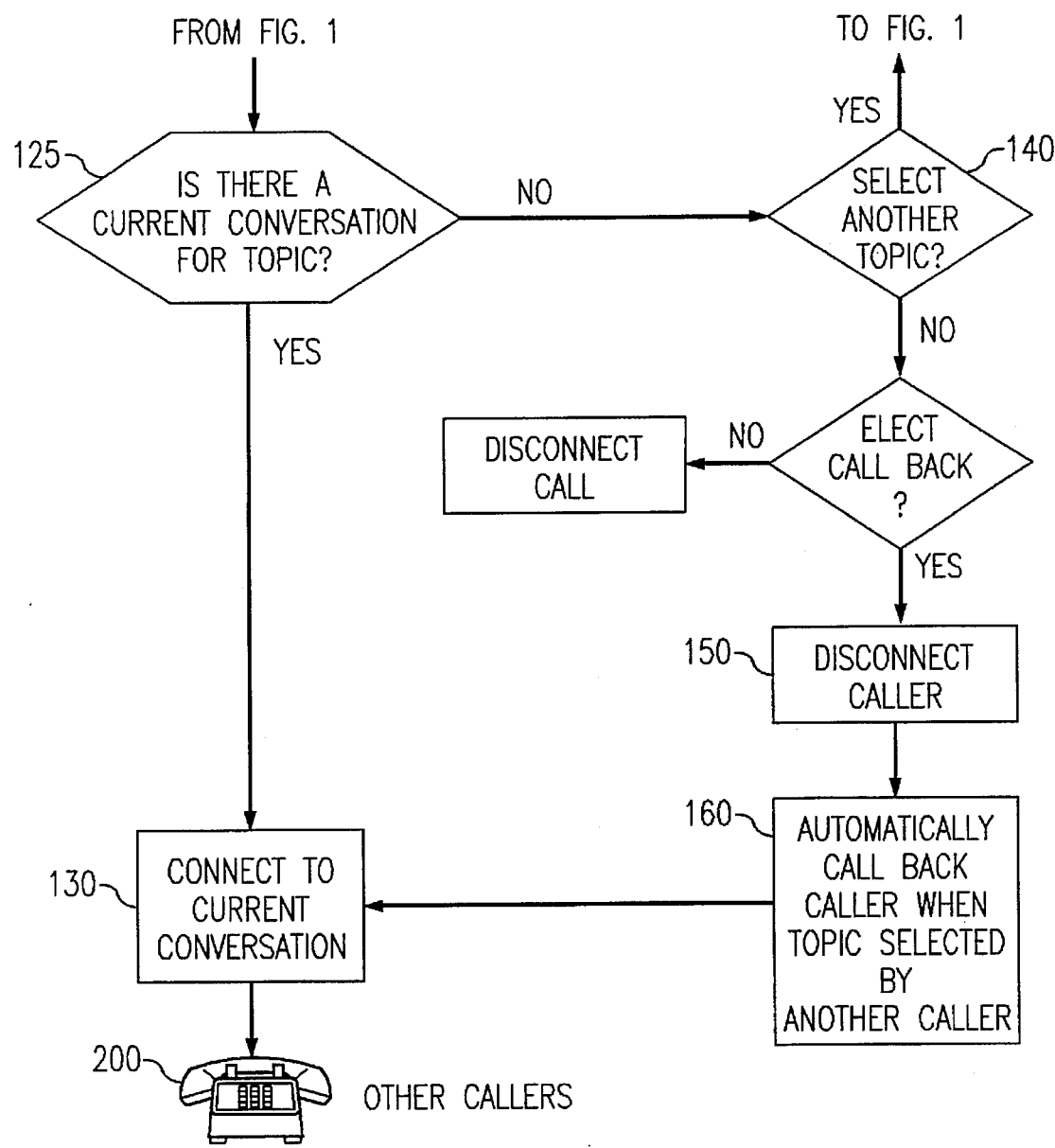
Figure 3:
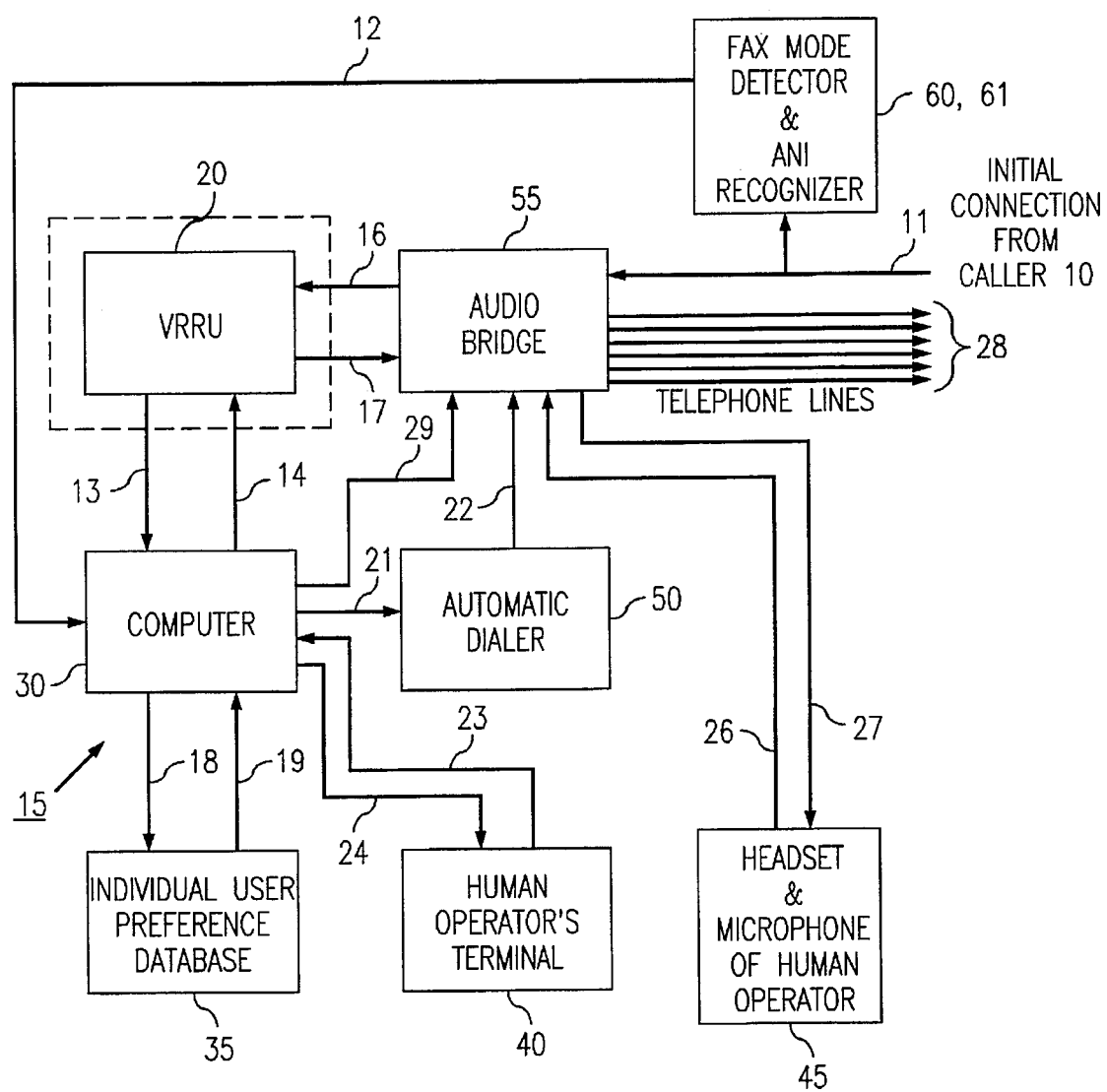
FIG. 3 is a block diagram of a calling customer connected through a telephone network to a preferred embodiment of the present invention.

Referring to FIGS. 1–3, a caller 10 interested in participating in a conversation on a particular topic or subject would dial a telephone number (access number) to access the system (step 101). This access number is preferably a 900 telephone number that is automatically charged to the caller's account.

When a communication path 11 is established between caller 10 and the system 15, caller 10 is prompted by the system 15 to select a desired conversation topic (step 102). In a preferred embodiment of the present invention, a voice recognition and response unit (VRRU) 20 interacts with caller 10 to identify the desired conversation topic. A suitable VRRU 20 for the present invention is described in U.S. Pat. No. 5,125,024.

Upon accessing the system 15, the VRRU 20 prompts caller 10 to select a desired conversation topic (step 101). An initial prompt greeting message is generated by the VRRU 20 welcoming the caller to the system and asking the caller to identify the conversation topic upon which the caller is interested in participating in a conversation.

The VRRU 20 is equipped with a voice decoder/speech recognizer (not shown) that permits caller 10 to verbally reply to the system 15 by stating the desired conversation topic or a word describing the desired topic into the handset of the caller's telephone.

Unlike the prior art systems, which permit a caller to access one or only a limited number of conversation topics by dialing a single access number, the system of the present invention 15 permits a caller 10 to access any one of at least nine hundred different conversation topics (available topics). To process such an extensive list of conversation topics and make it easier for the caller 10 to operate the system 15, the system 15 organizes the topics into a hierarchical tree structure.

Since a typical VRRU 20 is capable of processing approximately thirty responses per inquiry, it is desirable to utilize a hierarchical tree structure to organize and maximize the number of available topics. For instance, use of a two level tree structure would increase the number of available topics to approximately nine hundred (30×30). Thus, the first level of the tree may preferably contain the following:

the twenty-five words that are most likely to be provided by the caller 10 in response to an initial inquiry from the system 15; several words chosen for educational or public service value; and one or more command words to the system 15. Advantageously, many of the above-mentioned twenty-five words in the first tree level might broadly describe the available conversation topics. The one or more commands contained in the first tree level might include a word such as "help," which would result in the caller 10 becoming connected to a human operator 45, as shown in FIG. 3.

In the hierarchical tree structure, there is provided a second tree level for each of the words contained in the first tree level. The second tree level might contain the twenty-five words most likely to be stated by the caller 10 at that point in the tree structure and recognizable by the VRRU 20, several pre-selected subtopics, and one or more command words to the system 15. The second tree level serves to more narrowly define the available conversation topics.

A third, fourth, fifth, etc. tree level may be provided as necessary for some locations in the tree. Similarly, a few conversation topics in great demand that are known to the public by a short, common name might not require a second or higher level.

It may be advantageous to make the hierarchical tree deeper than a typical caller 10 desires, and to provide a means for allowing the caller 10 to terminate the question-response travel through the tree and randomly accept one of the branches of the hierarchical tree reachable from the present point. This may be accomplished by assigning a command word or phrase to that function. Alternatively, the option could be provided to the caller 10 by separate inquiry from the VRRU 20, or combined with a confirmation that the system 15 correctly recognized the caller 10's word or phrase.

Use of a hierarchical tree structure also permits the system 15 to provide multiple paths to each topic. The system 15 may thereby provide approximately thirty different ways of reaching each available topic. Since the caller(s) 10 will frequently use synonyms and slang to describe a desired topic, the system 15 is able to maximize the voice recognition hit rate (when a caller's desired topic is recognized by the system 15) by providing multiple paths to each conversation topic. It is understood, however, that there is no requirement that every topic be provided with either multiple paths or the same number of paths.

According to the present invention, therefore, the caller 10 verbally responds to an initial query from the VRRU 20, which is then processed by the VRRU 20 by attempting to match the response to the thirty words contained in the first level of the tree structure. When one of the thirty words contained in the first level is recognized (matched) by the VRRU 20, the caller 10 may provide a second verbal response that is again processed by the VRRU 20 by attempting to match the second response to the thirty words contained in the second level of the tree structure.

Utilization of a hierarchical tree structure, therefore, permits the caller 10 to circle back through the topic selection process (steps 102 and 120) and provide numerous verbal responses to describe the desired topic. The verbal response following each verbal response recognized by VRRU 20 corresponds to descending down one level in the tree structure.

The above description of a two tree hierarchical tree structure is simply used by way of example. It is understood that the present invention is not limited to a two tree hierarchical structure, but may be of a higher level such as a three, four, five, etc. level tree structure. It is also understood that each tree in the hierarchical structure need not be of uniform height and may contain branches of varying numbers.

Thus, caller 10 can describe the desired conversation topic by speaking directly into the caller's telephone handset. The VRRU 20 processes the caller's verbal command through voice recognition (step 120). Upon recognizing a word, the VRRU 20 attempts to match the recognized word or command to one of the words stored in that level of the hierarchical tree structure. If the caller's verbal command does not match one of the stored words, the VRRU 20 attempts to recognize the closest word stored in that particular level of the tree structure. If no words (voice commands) are recognized, the VRRU 20 will prompt caller 10 to select another word describing the desired topic (step 110) and return caller 10 to step 102 in FIG. 1. Accordingly, the VRRU 20 may process and recognize a string of words which may lead to a match with the available topics stored in the memory of the VRRU 20.

Once a desired topic has been recognized, the system 15 proceeds to tell caller 10 about the topic selected. This status information may include the number of conversations that are on-going, a full name for the topic, or the number of different topics covered by the caller's keywords thus far. It is understood that this status information may also be provided by the system 15 after every caller response recognized by the VRRU 20.

In the event that a match is not made between the voice command and the stored list of topics, the present invention also provides alternative means for selecting a desired topic. It is recognized, however, that voice recognition (step 120) is the primary interface.

As an alternative means for selecting a desired topic, the system 15 also permits caller 10 to input commands from a keypad of a telephone, computer, or the like (hereinafter generally referred to as "keypad") that are then processed by the system 15 (step 112). For instance, upon failing to match the caller's voice command to a stored topic, the VRRU 20 may prompt caller 10 to spell the desired topic. The caller 10 would then spell the desired word by depressing the push-button on the keypad that corresponds to each letter of the desired word.

Since a keypad interface operating in conjunction with a dictionary (step 113) stored in the system's memory can process more words than a typical voice recognition system, including synonyms, slang, abbreviations, etc., the keypad option (step 112) for spelling or inputting desired words provides an effective back-up interface for the primary voice recognition interface (step 120).

Alternatively, the keypad interface (step 112) may be performed by the VRRU 20 which is capable of recognizing the DTMF inputs from a keypad and/or recognizing a verbal response by caller 10 for each letter spelling the desired word. If the VRRU 20 cannot recognize a word or command during the above-described voice recognition process, the system 15 may prompt the caller 10 to verbally spell the desired word or topic. If the VRRU 20 can recognize enough of the audible letters, the system 15 may determine the desired word with the aid of the dictionary (step 113), much as if the word had been entered into keypad in step 112.

Lastly, in the event that a caller 10 is unable to locate the desired topic through the voice recognition and/or keypad options (steps 120 and 112, respectively), the system 15 also provides a final back-up by connecting the caller to a human operator 45 (step 114). The human operator 45 can inform caller 10 as to the availability of a desired topic and provide instructions for interfacing with the system 15.

Since the voice recognition option (step 120) is the most user-friendly option for caller 10, voice recognition provides the primary interface for the system. However, the keypad and human operator back-up options (steps 112 and 114, respectively) are also important features of the system 15. Since voice recognition systems typically have a limited vocabulary, unusual topics would have to be reached by relatively long strings of keywords and it is difficult to introduce new topics. By inputting a desired topic through the keypad (step 112), desired topics can be selected from a large dictionary of words (step 113), well fortified in slang, abbreviations, and hot keywords. Moreover, the human operators 45 act as the ultimate information source, collecting up-to-the-minute slang and topics to store in the keypad dictionary (step 113), as well as in the voice recognition option (step 120).

Additional paths or options (not shown) may also be provided in the system 15 for caller(s) 10 that require help or more information. For instance, several sequential failures to recognize a word, or the voice command "help" from caller 10 to the VRRU 20, could prompt the system 15 to connect caller 10 to the human operator 114 or to a prerecorded informational message.

Once the topic selection process is completed, the system 15 informs caller 10 of the simplest set of keywords to select in a future call to return to that particular topic. Future use of this simplest set of keywords will enable caller 10 to access the desired topic in a more direct manner.

Once the desired topic is selected, the system 15 then determines whether there currently exists an on-going conversation with respect to the selected topic (step 125). If a conversation is on-going, the system 15 generates a voice path to the conversation thereby connecting the caller to the on-going conversation for the topic selected (step 130).

In the event, however, that no current conversation for the desired topic is on-going in step 125, the system 15 asks caller 10 whether he/she is interested in another conversation topic (step 140). If caller 10 responds (either verbally or through the keypad option) in the affirmative, step 102 is repeated and the system 15 again prompts caller 10 to select a desired topic. The process of selecting the desired topic is the same as described above and may be repeated until caller 10 selects an available topic offered by the system 15.

Alternatively, if caller 10 elects not to select another topic in step 140, then the system 15 prompts caller 10 whether he or she wishes to be called back when another caller 200 selects the same conversation topic. If caller 10 does not wish to be automatically called back, then the system 15 disconnects the communication path 11 to caller 10 and caller 10 hangs up the telephone, thereby terminating the caller's session with the system 15.

However, if caller 10 elects to be automatically called back when another caller 200 also selects the same desired topic, the system 15 prompts the caller as to length of time that caller 10 would be available for receiving a call back. The caller 10 responds to this inquiry verbally or through the keypad option. Thereafter, the system 15 disconnects the communication path 11 to caller 10 and caller 10 hangs up the telephone (step 150).

For that particular caller 10, therefore, the system 15 stores in its memory (not shown) the desired topic and the length of time that caller 10 will be available for a call back. A clock (not shown) in the system 15 monitors the time that caller 10 will remain available for a call back. If, within that time period, another caller(s) 200 (who incidentally accesses the system 15 in the same manner as caller 10) selects the desired topic stored in the system's memory for caller 10, then the system 15 initiates a call back to caller 10 (step 160). Once connected to caller 10, the system 15 establishes a voice connection between caller 10 and caller(s) 200 to permit the respective callers to communicate with one another.

In a preferred embodiment of the present invention as illustrated in FIG. 3, an initial call from caller 10 (by dialing the access number for the system 15) is connected to an audio bridge 55 through an initial connection or communication path 11. The audio bridge 55 is of conventional design known in the art and provides voice paths between the initial connection 11 and other components in the system 15.

An ANI Recognizer 60 is connected to the initial connection 11 and identifies the Automatic Number Identification (ANI) for the particular caller 10. An ANI is an identification number commonly used in telecommunication systems corresponding to a caller's telephone or billing number. The caller's ANI is transmitted from the ANI Recognizer 60 to a computer 30 through communication path 12 to identify caller 10 and store information regarding the particular caller 10 based upon his or her ANI.

The audio bridge 55 also connects the initial connection 11 from caller 10 to the VRRU 20 through communication paths 16, 17. This interface 16, 17 permits the transmission of voice messages (prompts) to caller 10 and reception of voice responses (commands) from caller 10 (such as the desired conversation topic).

Communication paths 13, 14 are provided to allow information to be transmitted between the VRRU 20 and the computer 30. This interface 13, 14 between the VRRU 20 and the computer 30 permits the processing of the information received from caller 10. For instance, in step 102 of FIG. 1, the VRRU 20 transmits a greeting message and selection prompt to caller 10 through path 17. Should caller 10 verbally respond (step 120), the response is transmitted through path 16 to the VRRU 20 in order to process the response.

Referring again to FIG. 3, the computer 30 is also connected through a communication path 29 to the audio bridge 55. Accordingly, the computer 30 can control the audio bridge 55 by transmitting control information to the audio bridge 55.

The audio bridge 55 is further connected to telephone lines 28 that may be routed throughout the telecommunications network. Accordingly, when caller 10 selects a conversation topic for which there is an on-going conversation (step 125), the audio bridge 55 establishes a voice path (step 130) between caller 10 and the ongoing conversation through one or more telephone lines 28.

Referring now to step 125–160 in FIG. 2, where no current conversations exist relating to the topic selected by caller 10 and caller 10 elects to have the system 15 automatically call him or her back when another caller(s) 200 selects the same topic. The call-back feature (step 160) is accomplished through the utilization of an automatic dialer 50 as illustrated in FIG. 3. The automatic dialer 50 is connected to the computer 30 through communication path 21 and to the audio bridge 55 through communication path 22.

Thus, when another caller(s) 200 selects the same conversation topic as caller 10 (who elected a call back), the computer 30 initiates the call back by transmitting control information (including caller 10's telephone number based upon the previously identified ANI) through path 21 to the automatic dialer 50. The automatic dialer is connected through communication path 22 to the audio bridge 55. The automatic dialer 50 dials the telephone number for caller 10 based upon his or her ANI which is transmitted through a telephone line 28 connected to the audio bridge 55 to establish a voice connection (call back) to caller 10.

When caller 10 answers the call back, computer 30 instructs audio bridge 55 to connect caller 10 to caller(s) 200. However, to ensure that caller 200 is not connected to a facsimile machine or modem that answered at caller 10's number, the system 15 may also include a facsimile mode detector 61, which may be part of the ANI Recognizer 60 as illustrated in FIG. 3. Therefore, when facsimile mode detector 61 detects an facsimile machine or modem, a signal will be transmitted through path 12 to computer 30 which will instruct audio bridge 55 to disconnect the call-back to caller(s) 200.

In order to facilitate the interaction of a human operator with the system 15, a human operator is able to communicate with caller 10 through a headset and microphone 45. The headset and microphone 45 are connected to the audio bridge 55 through communication paths 26, 27 to facilitate communication between the operator and caller 10.

Additionally, the operator is able to communicate with the computer 30 through a terminal 40. Terminal 40 is connected to computer 30 via communication paths 23 and 24. Thus, the operator may be able to access the computer's databases and update the available topics and/or dictionary 113.

For frequent callers, the system 15 may include a database 35 stored in the memory of computer 30 which contains individual user preferences based upon the frequent caller's prior usage. This database may contain information such as the frequent caller's previous topic selections to facilitate the caller's quick and direct access to previously selected topics. During each session, the computer 30 collects and stores pertinent information about each caller 10 in the database 35.

The database 35 may also contain information on the speech pattern of caller 10 to facilitate voice recognition (step 120). This information may be collected from the VRRU 20 and stored in the database 35 for particular caller(s) 10 based upon prior interaction with the system 15. The database 35 may additionally contain average speech patterns for persons residing in particular geographic regions or telephone area codes to allow for differences in speech accents from location to location.

It will be appreciated by those skilled in the art that the present invention may be applied in areas other than telephone talk lines. It is to be understood that the above description is only of a preferred embodiment of the present invention. Numerous other arrangements may be devised by one skilled in the art without departing from the spirit and scope of the invention. The invention is thus limited only as defined in the accompanying claims.

What is claimed is:

1. A method for providing an initial caller to a telecommunications system with access to one of a plurality of conversations each relating to a particular topic available in the system, comprising the steps of:

(a) establishing a communication path between said caller and said system;

(b) communicating with said system to select a desired conversation topic;

(c) determining whether a conversation relating to the desired conversation topic is currently on-going;

(d) establishing a communication path between said caller and the conversation if said conversation is on-going; and (e) if no current conversation relating to the desired conversation topic is on-going, terminating the communication path between said initial caller and said system, automatically returning a call to said initial caller when a second caller selects the desired conversation topic selected by said initial caller and said initial caller has elected to be called back, and connecting said initial caller to said second caller.

2. The method according to claim 1, further comprising the steps of:

(a) storing a list of available conversation topics in a database associated with said telecommunications system;

(b) selecting the desired conversation topic; and (c) searching said list of available conversation topics to determine if said desired conversation topic corresponds to one of said available conversation topics.

3. The method according to claim 2, wherein the communicating step comprises the steps of:

transmitting information between said initial caller and a voice recognition and response unit to select the desired conversation topic, said voice recognition and response unit receiving audio signals from said initial caller for identifying the desired conversation topic and generating audio signals to provide prompts and response messages to said initial caller.

4. The method according to claim 2, wherein said available conversation topics are organized in said system database in a hierarchical tree structure providing multiple selection paths to at least one of said available conversation topics.

5. The method according to claim 3, wherein the voice recognition and response unit processes a voice command from said initial caller by voice recognition.

6. The method according to claim 5, further comprising the steps of:

(a) recognizing the voice command of said initial caller; and (b) comparing said recognized voice command to one of the available conversation topics to identify the desired conversation topic.

7. The method according to claim 6, wherein, if no desired conversation topic is identified from the voice command, said system receives additional voice commands from said initial caller, recognizes one or more of the additional voice commands, and compares the recognized additional voice command to the available conversation topics to identify the desired conversation topic.

8. The method according to claim 3, wherein the initial caller inputs commands on a telephone keypad to transmit information to said system to select the desired conversation topic.

9. The method according to claim 8, wherein the communicating step further comprises the transmission of information between the initial caller and a human operator to select the desired conversation topic.

10. The method according to claim 2, wherein the available conversation topics are updated and stored in said system database based upon the frequency of callers selecting particular conversation topics.

11. The method according to claim 1, wherein the determination step comprises identifying the conversation topic for all on-going conversations in said system and determining whether the desired conversation topic is the subject of any of the on-going conversations.

12. The method according to claim 1, further comprising the steps of:
    (a) identifying an automatic number identification associated with said initial caller;
    (b) storing the automatic number identification associated with said initial caller in the system database; and
    (c) automatically dialing a telephone number based upon the stored automatic number identification associated with said initial caller in order to initiate a return call to the initial caller.

13. The method according to claim 12, further comprising the steps of:
    (a) determining whether said return call is answered by a facsimile machine or modem; and
    (b) disconnecting said return call when it is determined that said return call is answered by a facsimile machine or modem.

14. The method according to claim 1, further comprising the step of accessing said system by dialing an access number from a customer calling station.

15. The method according to claim 2, wherein said available conversation topics stored in said system database are determined from desired conversation topics previously selected by said initial caller.

16. The method according to claim 15, further comprising the steps of:
    (a) identifying an automatic number identification associated with said initial caller;
    (b) storing said automatic number identification in said system database;
    (c) collecting and storing in said system database the desired conversation topic selected by said initial caller; and
    (d) accessing the stored desired conversation topic for said initial caller based upon the identified automatic number identification in order to customize the available conversation topics to said initial caller.

17. The method according to claim 6, wherein said recognition step further comprises the steps of:
    (a) identifying an automatic number identification associated with said initial caller;
    (b) storing said automatic number identification in said system database;
    (c) collecting and storing in said system database a particular speech pattern of said initial caller;
    (d) accessing the stored speech pattern of said initial caller based upon the identified automatic number identification; and
    (e) adjusting said voice recognition and response unit based upon said accessed speech pattern to enhance the recognition of said voice command of said initial caller.

18. The method according to claim 2, wherein said available conversation topics stored in said system database are determined based upon an estimated geographical location of said initial caller.

19. The method according to claim 18, further comprising the steps of:
    (a) identifying art automatic number identification associated with said initial caller;
    (b) estimating a geographic location of said initial caller based upon the identified automatic number identification; and
    (c) selecting available conversation topics that are relevant to the estimated geographic location of said initial caller.

20. The of method according to claim 6, wherein said recognition step further comprises the steps of:
    (a) storing in said system database particular speech patterns for audible accents of persons situated in different geographic locations;
    (b) identifying an automatic number identification associated with said initial caller;
    (c) estimating a geographic location of said initial caller based upon the identified automatic number identification;
    (d) accessing the stored speech pattern for the estimated geographic location of said initial caller; and
    (e) adjusting said voice recognition and response unit based upon said accessed speech pattern to enhance the recognition of said voice command of said initial caller.

21. A telecommunications system for connecting an initial caller to one of a plurality of conversations between other users of the system, each conversation relating to a particular conversation topic, comprising:
    (a) voice recognition means for recognizing audio commands from said initial caller to select a desired conversation topic;
    (b) memory means comprising a database of available conversation topics;
    (c) processing means for searching the database to determine if the desired conversation topic selected by the initial caller is one of the available conversation topics and for determining whether a conversation between other users of the system relating to the desired conversation topic is on-going;
    (e) an audio bridge connected to the voice recognition and response means for establishing a communication path between said initial caller and said other users having an on-going conversation relating to the desired conversation topic; and
    (f) an automatic dialer controlled by said processing means and connected to the audio bridge, wherein, if no current conversation relating to the desired conversation topic is on-going and said initial caller elects to be called back by said system, said automatic dialer automatically returns a call to said initial caller when a second caller selects the desired conversation topic selected by said initial caller and said audio bridge connects said initial caller to said second caller.

22. The telephone system of claim 21, further comprising:
    (a) an automatic number identification recognizer for identifying an automatic number identification associated with said initial caller;
    (b) second memory means for storing the automatic number identification associated with said initial caller, wherein said processing means transmits a control signal to said automatic dialer based upon the stored automatic number identification associated with said initial caller and the automatic dialer dials a telephone number to establish a communication path to said initial caller through the audio bridge.

* * * * *